(No Model.)
W. S. PHELPS & C. D. DRAKE.
CHURN.
No. 368,233. Patented Aug. 16, 1887.
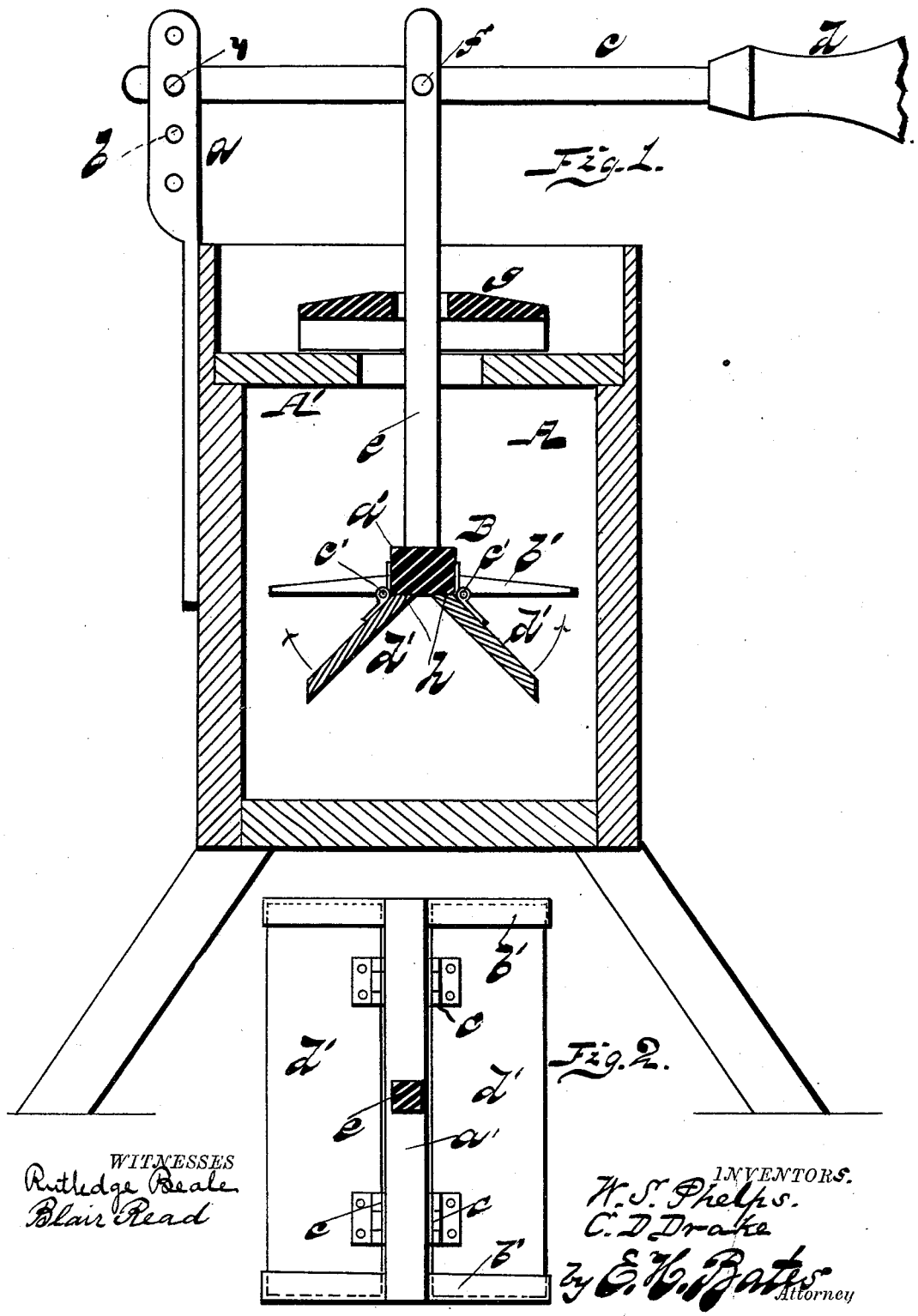
WITNESSES
Rutledge Beale
Blair Read
INVENTORS.
W. S. Phelps.
C. D. Drake
by E. H. Bates
Attorney

UNITED STATES PATENT OFFICE.

WILLIAM S. PHELPS AND CLINTON D. DRAKE, OF MILTONVALE, KANSAS.

CHURN.

SPECIFICATION forming part of Letters Patent No. 368,233, dated August 16, 1887.

Application filed July 10, 1885. Renewed July 2, 1887. Serial No. 243,272. (No model.)

*To all whom it may concern:*

Be it known that we, WILLIAM S. PHELPS and CLINTON D. DRAKE, both citizens of the United States, residing at Miltonvale, in the county of Cloud and State of Kansas, have invented certain new and useful Improvements in Churns, of which the following is a specification, reference being had therein to the accompanying drawings.

This invention has relation to improvements in churns; and it consists in the construction and novel arrangement of devices, as will be hereinafter fully explained, and particularly pointed out in the appended claim.

The annexed drawings, to which reference is made, fully illustrate our invention, in which—

Figure 1 is a vertical sectional view of our churn, and Fig. 2 is a plan view of the dasher.

Referring by letter to the accompanying drawings, A designates the churn box or body constructed with a vertically-projecting flange forming a rabbet, in which the cover A' is seated below the top of the churn-body, with a vertical standard, $a$, at one end, having perforations $b$, to which standard is pivoted one end of a lever, $c$, the opposite end of which has an operating-handle, $d$. The dasher-rod $e$ is pivoted to the middle of the lever, as at $f$, and passes through a large opening in the lid or cover A' of the box. A cap, $g$, plays loosely on the rod, and is channeled on its under side and serves to prevent the cream from spattering from the opening in the box-cover, and permits the cream that has worked through the opening to run back into the churn.

The dasher is indicated by the letter B, and it consists of a longitudinal bar, $a'$, secured to the lower end of the dasher-rod, and having secured at each end a transverse bar, $b'$, and beneath which is hinged, as at $c'$, two wings or paddles, $d'$ $d'$, which agitate the cream when the lever is operated. The downward stroke of the dasher-rod causes the wings to open and present a flat face to the liquid. The transverse end bars prevent the wings from rising too high and serve as a stop for said wings.

In the upward movement of the dasher the wings assume a V-shaped position, caused by being hinged as above mentioned, and their inner ends being beveled, as at $h$, form stops to said wings and prevent them from moving too far inward or toward one another, and the lift of the dasher is made easy.

We are aware that it is not new to secure deflectors to the dasher-rods of churns for preventing the escape of the cream through the churn-cover perforation, and do not claim, broadly, such device.

We are well aware that slides have been applied to churns having vertically-reciprocating dashers for the purpose of preventing the splashing out of the cream during the process of churning. This is not our invention. It is obvious from what we have above described, and illustrated in the annexed drawings, that we employ a channeled slide on top of the churn-cover, which not only serves to return back into the body of the churn the splashings, but also affords a center-guide for the dasher-rod $e$.

Having described our invention, what we claim is—

The combination of the churn-body having an upwardly-projecting flange, the cover having a large aperture and fitted therein, as described, a sliding apertured cap having a channel on its under side for the purpose stated, and fitting over the aperture in the cover, a dash-rod provided with a dasher passing through the cap and cover, and the lever for operating the dash-rod pivoted to a standard of the churn-body, as described.

In testimony whereof we affix our signatures in presence of two witnesses.

WILLIAM S. PHELPS.
CLINTON D. DRAKE.

Witnesses:
GEO. O. JAMES,
LUMAN G. HEUSTED.